June 28, 1927.
G. M. PETE ET AL
1,633,792
TOWROPE
Filed April 24, 1925
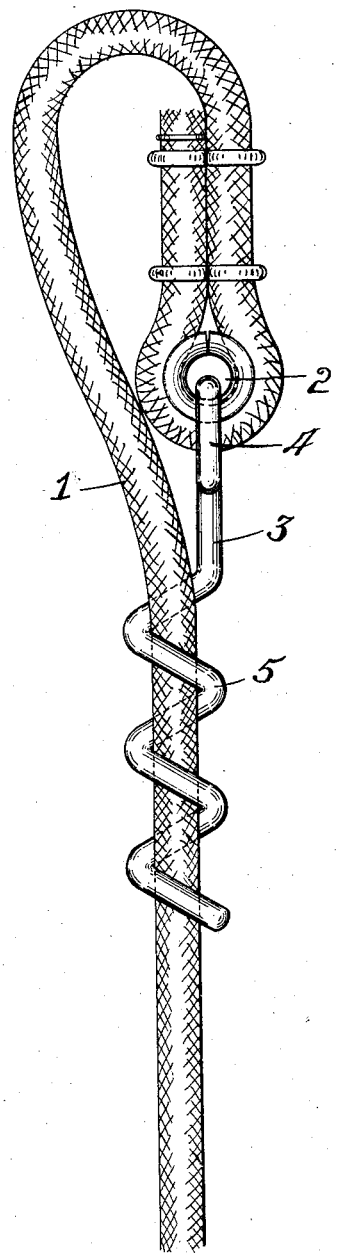
Inventor
George M. Pete,
Clayton F. Pete,
By Owen Owen & Crampton.
Attorneys, Patented June 28, 1927.

1,633,792

UNITED STATES PATENT OFFICE.

GEORGE M. PETE AND CLAYTON F. PETE, OF TOLEDO, OHIO.

TOWROPE.

Application filed April 24, 1925. Serial No. 25,550.

This invention relates to a rope hitch and is particularly intended for use in connection with automobile tow lines.

In the use of tow lines for automobiles and the like it is common to provide the ends of the line with hook members for engagement with the rope in spaced relation to its end after it has been looped around a part of the automobile to which it is to be attached. These hooks are objectionable as care must be taken to prevent a disengagement of the hook from the rope when draft is applied.

The object of the invention is the provision of a strong, durable and simple construction of a hitch of the class described, which is adapted to be permanently attached to one end of a rope and is capable of being easily and quickly engaged to the rope intermediate its ends and released therefrom, and when engaged with the rope is prevented from accidental disengagement therefrom.

The invention is fully described in the following specification, and one embodiment illustrated in the accompanying drawing which is a side elevation of a portion of the rope with the hitch attached to one end thereof and in engagement with an intermediate portion of the rope.

Referring to the drawings, 1 designates a rope having an eye or loop 2 at an end thereof, and 3 the hitch embodying the invention. This hitch comprises a bar of metal or other suitable material suitable for the purpose having at one end an eye portion 4 for interengagement with the rope eye 2 and having its shank portion formed with the spiral 5. The spiral preferably consists of at least three convolutions and is of open form with the width of the space between the convolutions slightly greater than the diameter of the rope to enable the rope to be freely passed therethrough when engaging with the spiral. The axial opening through the spiral is also of a size to freely receive the rope so that the hitch can slip lengthwise on the rope when in engagement therewith.

In engaging the rope with or disengaging it from the spiral 5 it is given a spiral movement around the spiral to cause it to follow the spiral space between the convolutions of the spiral. In this manner the spiral portion of the hitch may be easily and quickly engaged with or disengaged from the rope, and when engaged the hitch is free to have sliding movement longitudinally of the rope without any liability of being accidentally disengaged therefrom.

If it is desired to prevent slipping or sliding of the hitch 3 on the rope after being engaged therewith, the rope may be given a hitch or turn around the straight inner end portion of the hitch shank before being engaged with the spiral 5. The straight portion of the shank is made of sufficient length for this purpose. In use, the pull or tension is directly exerted on the straight shank portion, and this has been found particularly advantageous over a construction in which the pull is transmitted to a helical convolution, because in the latter case the result usually is that uncoiling takes place, thereby rendering the hitch ineffective for the purpose.

Having thus described our invention, what we claim as new and desire to secure by Letters Patent is:

1. A tow rope having an eye at an end thereof and a hitch having an eye at an end thereof interengaged with the rope eye, a relatively straight portion on said hitch adjacent said eye, and a plurality of helical convolutions integral with said straight portion and surrounding said rope whereby tension is directly exerted on the straight shank portion.

2. A tow rope having an eye at an end thereof and a hitch having an eye at an end thereof interengaged with the rope eye, a relatively straight portion on said hitch adjacent said eye, and a plurality of helical convolutions integral with said straight portion and surrounding said rope, said shank being of a length sufficient to permit the rope to be given a turn therearound before being engaged with said convolutions.

In testimony whereof we have hereunto signed our names to this specification.

GEORGE M. PETE.
CLAYTON F. PETE.